ns2,980,743
Patented Apr. 18, 1961

2,980,743
TREATMENT OF GASES

Robert W. Toft, Orange, N.J., assignor, by mesne assignments, to Engelhard Industries, Inc., Newark, N.J., a corporation of Delaware No Drawing. Filed Mar. 19, 1958, Ser. No. 722,392

10 Claims. (Cl. 260—677)

This invention relates to the selective oxidation of carbon monoxide in admixture with ethylene.

The presence of carbon monoxide in ethylene is undesirable for at least two reasons: first, carbon monoxide decreases the value of ethylene as an anesthetic; and second, it deleteriously affects the properties of polymers prepared from ethylene.

Since carbon monoxide and ethylene have similar chemical properties, i.e. both are reducing gases, the separation of the two is not possible by scrubbing with solutions or solids normally used for the removal of carbon monoxide from inert gases. Low temperature fractional distillation can be employed to separate the gases, but it is time-consuming and an expensive process.

Removal of carbon monoxide from ethylene by catalytic means is complicated by the fact that ethylene, as currently manufactured, contains several impurities in addition to the carbon monoxide. Thus, hydrogen, oxygen, acetylene and carbon dioxide are usually present, in addition to less reactive compounds such as methane and ethane. If it is desired to remove the carbon monoxide by oxidation to carbon dioxide, which can readily be removed from ethylene by conventional means such as caustic scrubbing, Equation 1 would apply:

(1) $CO + \tfrac{1}{2} O_2 = CO_2$ 

However, the following reaction would interfere with, or cancel out this removal:

(2) $H_2 + \tfrac{1}{2} O_2 = H_2O$ 
(3) $C_2H_4 + 2O_2 = 2CO + 2H_2O$ 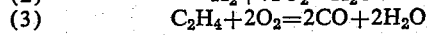

However, in spite of these theoretical difficulties, it has been found, in accordance with the present invention, that it is possible in practice to eliminate the carbon monoxide content of commercial ethylene by selective catalytic oxidation.

The process of the invention apparently also effects quantitative removal of acetylene, which is often found as an impurity in ethylene. The acetylene is probably removed by reaction with hydrogen, which is also present as an impurity. The process appears to be sensitive to variations in the concentrations of hydrogen and oxygen in the gas mixture; when two gas mixtures prepared from different lots of commercial ethylene are treated, the results are found to vary. With hydrogen and carbon monoxide competing for the available oxygen, an increase in the amount of oxygen generally causes a more efficient removal of carbon monoxide.

The catalyst used in the process is rhodium metal per se on a suitable support, or a mixture of rhodium and another platinum group metal on a suitable support. The rhodium metal may be present in the range of about 0.01 to 2.0 percent by weight of the total catalyst, i.e., metal and support, with the second metal of the platinum group, if added, being present in the same range of concentration. Suitable catalyst supports include activated alumina, silica, kieselguhr, silica gel, diatomaceous earth and the like. The support or carrier for the catalyst metal may be in the form of pellets, powder or granules, and preferably comprises activated alumina pellets. The supported catalyst may be prepared in any suitable manner, i.e. by treating the carrier or support with a solution of a suitable metal compound or compounds, and then reducing the metal compound or compounds, to metal.

The reaction temperature may be in the range of about 25° C. to about 150° C., preferably about 100 to 130° C. Temperatures in excess of about 150° C. are detrimental to the catalyst in that efficiency is impaired, and recovery of activity by treatment at low temperatures is slow and probably incomplete. For this reason, operating temperatures as low as possible, which are consistent with good activity, are employed.

The space velocity of the gas mixture may be in the range of about 100 to 5000 standard volumes of gas per hour per volume of catalyst, preferably 1250 to 5000 volumes per hour per volume. The reactor pressure may be in the range of atmospheric to 1000 p.s.i.g., or higher.

Oxygen must be added to the gas stream before it is passed over the catalyst, and may be added either per se or in the form of air, for example. Sufficient oxygen should be added so that the amount added, in addition to that already present in the gas, if any, is equivalent to or in excess of the stoichiometric quantity required for complete reaction with the carbon monoxide. Generally speaking, the oxygen may be present in the range of about one to twenty times the stoichiometric equivalent required for reaction with carbon monoxide, preferably about two to eight times the stoichiometric quantity.

When a gas mixture containing, by volume, 0.038 percent oxygen, 0.02 percent carbon monoxide, 2 percent nitrogen, balance ethylene, was treated in accordance with the procedure described in Example V below, typical analyses of outlet oxygen were 0.01 to 0.03 percent by volume. Since the complete combustion of carbon monoxide to carbon dioxide would cause a decrease in oxygen concentration of only 0.01 percent by volume, it is apparent that the oxygen is reacting with the ethylene by the reaction of Equation 3 above, or 4:

(4) $C_2H_4 + 3O_2 = 2CO_2 + 2H_2O$ 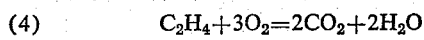

This is also indicated by the fact that outlet carbon dioxide values are usually higher than the quantity which can be accounted for by the combustion of carbon monoxide, ranging, generally, from 0.01 to 0.04 percent, by volume. The loss of ethylene product can be minimized by using less oxygen in the gas mixture. However, as the oxygen concentration is decreased, the efficiency of carbon monoxide removal is impaired.

The invention will be further illustrated by the following specific examples:

Example I

A gas mixture containing, by volume, 0.038 percent carbon monoxide, 0.02 percent oxygen, 4 percent nitrogen, balance ethylene, was passed over 10 ml. of a catalyst consisting of 0.5 percent by weight rhodium on $\tfrac{1}{8}''$ cylindrical pellets of activated alumina, at a rate of 50 liters per hour, measured at standard conditions of temperature and pressure. At temperatures of 94 to 149° C., and a reactor pressure of 500 p.s.i.g., the outlet carbon monoxide was 0.006 percent by volume, indicating an 84 percent removal of carbon monoxide.

Example II

A gas mixture containing, by volume, 0.022 percent carbon monoxide, 0.04 percent oxygen, 2 percent nitrogen, balance ethylene, was passed over 20 ml. of the same type of catalyst used in Example I, at a rate of 50 liters per hour, and using a reactor pressure of 500 p.s.i.g. At temperatures in the range of 109 to 118° C., a typical outlet carbon monoxide analysis was 0.0021 percent by volume, indicating a 90 percent carbon monoxide removal.

*Example III*

A gas mixture containing, by volume, 0.028 percent carbon monoxide, 0.04 percent oxygen, 2 percent nitrogen, balance ethylene, was passed over 10 ml. of a catalyst consisting of 0.4 percent by weight platinum and 0.1 percent by weight rhodium, on 1/8" activated alumina pellets, at a rate of 50 liters per hour, and under a reactor pressure of 500 p.s.i.g. At at temperature of 112° C., the outlet carbon monoxide analysis was 0.005 percent by volume, indicating an 82 percent removal of carbon monoxide.

*Example IV*

A gas mixture containing, by volume, 0.023 percent carbon monoxide, 0.08 percent oxygen, 2 percent nitrogen, balance ethylene, was passed over 25 ml. of a catalyst of the same type as used in Example I above, at the rate of 25 liters per hour, and under a reactor pressure of 500 p.s.i.g. At a temperature of 123° C., the outlet carbon monoxide analysis was 0.002 percent by volume, indicating a 91 percent removal of the carbon monoxide.

*Example V*

Commercial ethylene containing, by volume, 0.0021 percent carbon monoxide, and 0.0026 percent oxygen, was passed over 10 ml. of a catalyst of the same type employed in Example I above, at the rate of 50 liters per hour, and under a reactor pressure of 460 p.s.i.g. At temperatures as low as 86° C., neither carbon monoxide nor oxygen could be detected in the effluent gas by means of instruments capable of measuring concentrations of these gases as low as 5 parts per million.

It will be obvious to those skilled in the art that many modifications may be made within the scope of the present invention without departing from the spirit thereof, and the invention includes all such modifications.

What is claimed is:

1. A process for removing carbon monoxide from a mixture thereof with ethylene and oxygen, which comprises passing the mixture over a rhodium-containing catalyst at a temperature in the range of about 25 to 150° C.

2. A process according to claim 1 in which the rhodium metal is supported on a carrier.

3. A process according to claim 2 in which the carrier is activated alumina.

4. A process for removing carbon monoxide from a mixture thereof with ethylene and oxygen, which comprises passing the mixture over a catalyst containing rhodium and a second platinum group metal at a temperature in the range of about 25 to 150° C.

5. A process according to claim 4 in which the catalytic metals are supported on a carrier.

6. A process according to claim 5 in which the carrier is activated alumina.

7. A process for removing carbon monoxide from a mixture thereof with ethylene and oxygen, which comprises passing the mixture over a rhodium and platinum-containing catalyst at a temperature in the range of about 25 to 150° C.

8. A process according to claim 7 in which the catalytic metals are supported on a carrier.

9. A process according to claim 8 in which the carrier is activated alumina.

10. A process according to claim 1 in which the carrier is alumina-silica.

References Cited in the file of this patent

UNITED STATES PATENTS

| | | |
|---|---|---|
| 1,793,813 | MacKinnon | Feb. 24, 1931 |
| 2,381,707 | Wood et al. | Aug. 7, 1945 |
| 2,772,147 | Bowen et al. | Nov. 27, 1956 |

FOREIGN PATENTS

| | | |
|---|---|---|
| 555,588 | Great Britain | Aug. 30, 1943 |

OTHER REFERENCES

Gas Engineers' Handbook, prepared by the Gas Engineers' Handbook Committee of the Pacific Coast Gas Association, San Francisco, California, 1st Edition, 2nd Impression, McGraw-Hill Book Co., Inc., New York, 1934, page 365.

Berkman et al.: "Catalysis," pages 761–763 and 773, Reinhold Publishing Co., New York, New York (1940).